United States Patent [19]

Fukushima et al.

[11] 4,445,662

[45] May 1, 1984

[54] ENGINE MOUNTING STRUCTURE

[75] Inventors: Masao Fukushima, Fuchu; Komei Yazaki, Yokohama, both of Japan

[73] Assignee: Nissan Motor Company, Limited, Yokohama, Japan

[21] Appl. No.: 251,854

[22] Filed: Apr. 7, 1981

[30] Foreign Application Priority Data

Apr. 17, 1980 [JP] Japan .................. 55-51349

[51] Int. Cl.³ .......................................... F16M 13/00
[52] U.S. Cl. .................................. 248/559; 248/659
[58] Field of Search ................. 248/559, 659, 605; 267/140.1; 180/291, 312, 300

[56] References Cited

U.S. PATENT DOCUMENTS

| | | | |
|---|---|---|---|
| 3,322,379 | 5/1967 | Flannelly | ............ 267/140.1 X |
| 3,388,772 | 6/1968 | Marsh et al. | . |
| 3,445,080 | 5/1969 | Flannelly | . |
| 3,667,706 | 6/1972 | Tiberghien | . |
| 4,377,218 | 3/1983 | Fukushima | ............ 248/559 X |

FOREIGN PATENT DOCUMENTS

| | | |
|---|---|---|
| 2807160 | 8/1979 | Fed. Rep. of Germany . |
| 1135312 | 4/1957 | France . |
| 1520695 | 4/1968 | France . |
| 2431639 | 2/1980 | France . |
| 2444852 | 7/1980 | France . |
| 1026358 | 4/1966 | United Kingdom . |
| 2071266 | 9/1981 | United Kingdom . |

OTHER PUBLICATIONS

"Ingenieurs de l'Automobile (1980), No. 5, Jun., Jul., Aug., Boulogne, FR", M. Georges Rodier, pp. 52 to 55.

Primary Examiner—J. Franklin Foss

[57] ABSTRACT

An engine mounting structure for mounting an automotive engine on the body structure of an automotive vehicle, comprising the parallel combination of a main oscillatory system adapted to damp vibrations produced by the engine during medium-speed cruising of the vehicle and an auxiliary oscillatory system adapted to cancel the vibrations to be transmitted through the main oscillatory system under high-speed cruising conditions of the vehicle for reducing booming noises to be produced in the vehicle cabin under such conditions. The auxiliary oscillatory system comprises at least one mass member and at least two resilient blocks structurally intervening between the mass member and the main oscillatory system.

5 Claims, 17 Drawing Figures

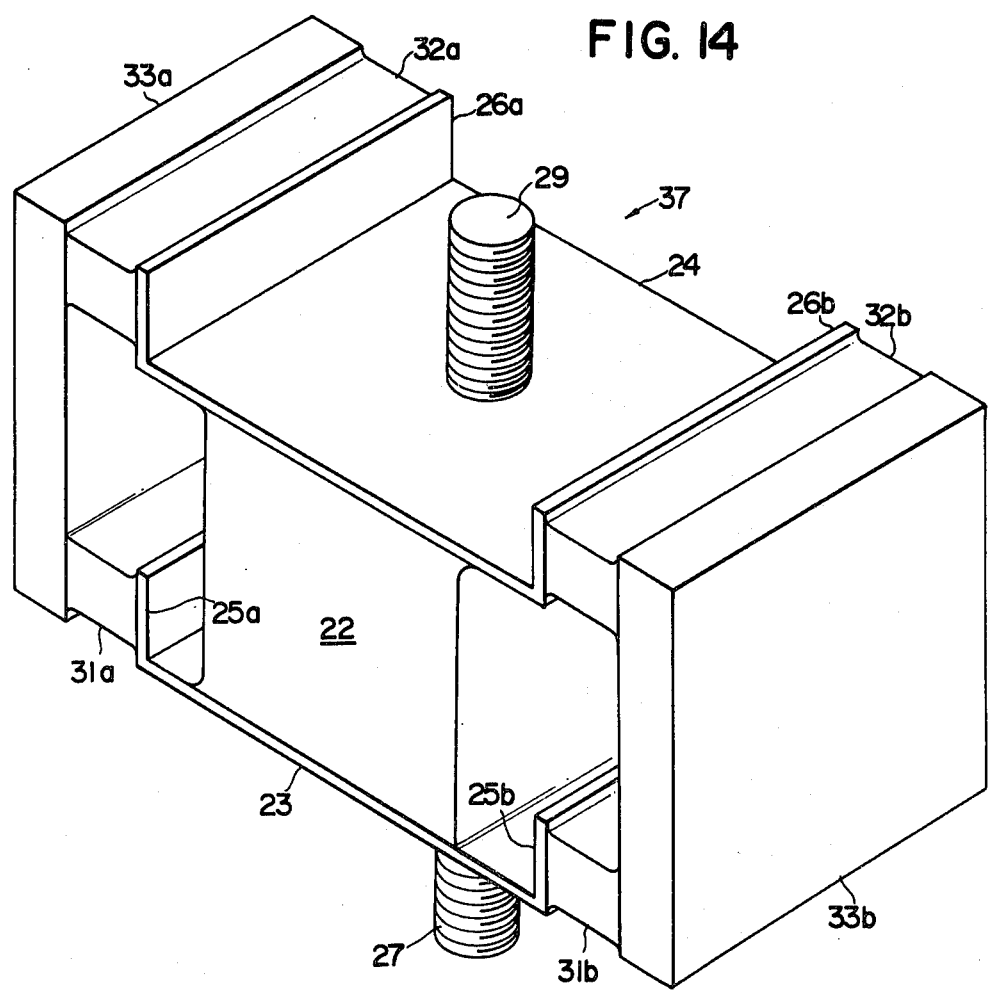

ENGINE MOUNTING STRUCTURE

FIELD OF THE INVENTION

The present invention relates to an engine mounting structure used for the mounting of a power plant such as an internal combustion engine on the body structure of an automotive vehicle.

BRIEF DESCRIPTION OF THE PRIOR ART

A conventional engine mounting structure used for the mounting of an internal combustion engine on the body structure of an automotive vehicle comprises a pair of shock and vibration insulating units each using a resilient block. The resilient block is connected between the body structure of the vehicle and an engine-side bracket secured to the engine mounted on the vehicle body structure. In a prior-art engine mounting structure of this nature, the resilient block forming part of the shock and vibration insulating unit is usually designed to have a relatively large spring constant so as to be capable of taking up the vibrations of the engine under medium-speed cruising conditions of the vehicle.

During high-speed cruising of an automotive vehicle, the engine tends to produce vibrations at frequencies within a certain relatively low range. The vibrations of the engine at such frequencies, in turn, tend to cause production of stifled, droning noises or "booms" in the vehicle cabin. In order that the stock and vibration insulating unit of a conventional engine mounting structure be capable of absorbing such low-frequency vibrations, the resilient block of the shock and vibration insulating unit is required to have an increased weight. This results in unwieldy construction of the shock and vibration insulating unit and accordingly in enlarged construction of the engine mounting structure as a whole, adding to the seriousness of the space requirement for the mounting structure and requiring additional time and labor for the installation of the engine and the engine mounting structure on the body structure of an automotive vehicle.

The present invention contemplates elimination of these and other drawbacks which have thus far been inherent in prior-art engine mounting structures for automotive vehicles.

SUMMARY OF THE INVENTION

In accordance with the present invention, there is provided an engine mounting structure for mounting an automotive engine on the body structure of an automotive vehicle, comprising at least one shock and vibration insulating unit comprising a first coupling member to be connected to the body structure of the vehicle, a second coupling member to be connected to the body structure of the engine and spaced apart from the first coupling member, a main resilient block structurally intervening between the first and second coupling members, a mass member, a first auxiliary resilient block structurally intervening between the first coupling member and the mass member, and a second auxiliary resilient block structurally intervening between the second coupling member and the mass member so as to reduce the stifled booming noises to be produced in the vehicle cabin of the vehicle to be driven by the engine mounted thereon.

BRIEF DESCRIPTION OF THE DRAWINGS

The drawbacks of prior-art engine mounting structures and the features and advantages of an engine mounting structure according to the present invention will be more clearly understood from the following description taken in conjunction with the following drawings in which like reference numerals designate similar or corresponding members, units and structures and in which:

FIG. 14 is a perspective view of the shock and vibration insulating unit illustrated in FIG. 13;

FURTHER DESCRIPTION OF THE PRIOR ART

Figure 1:
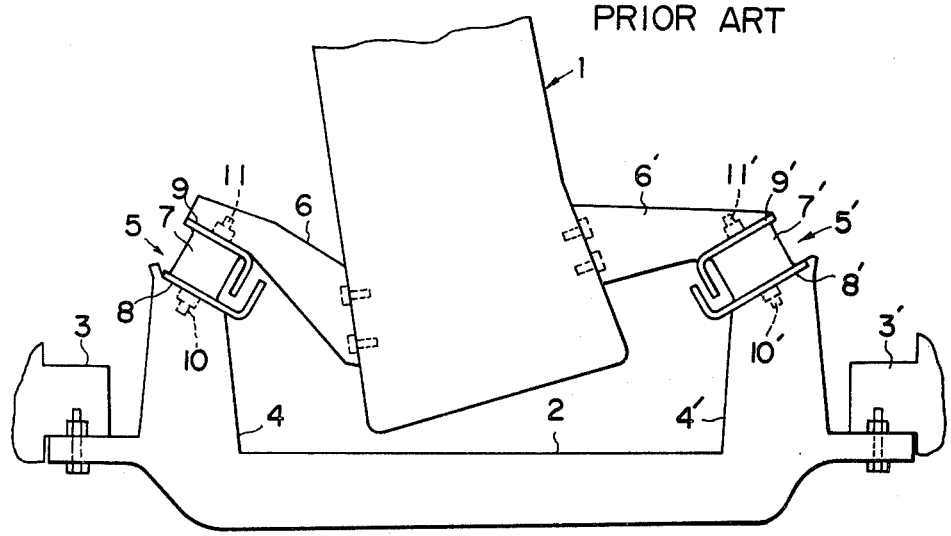
FIG. 1 is a fragmentary front elevation view showing a representative example of a prior-art engine mounting structure.
Figure 2:
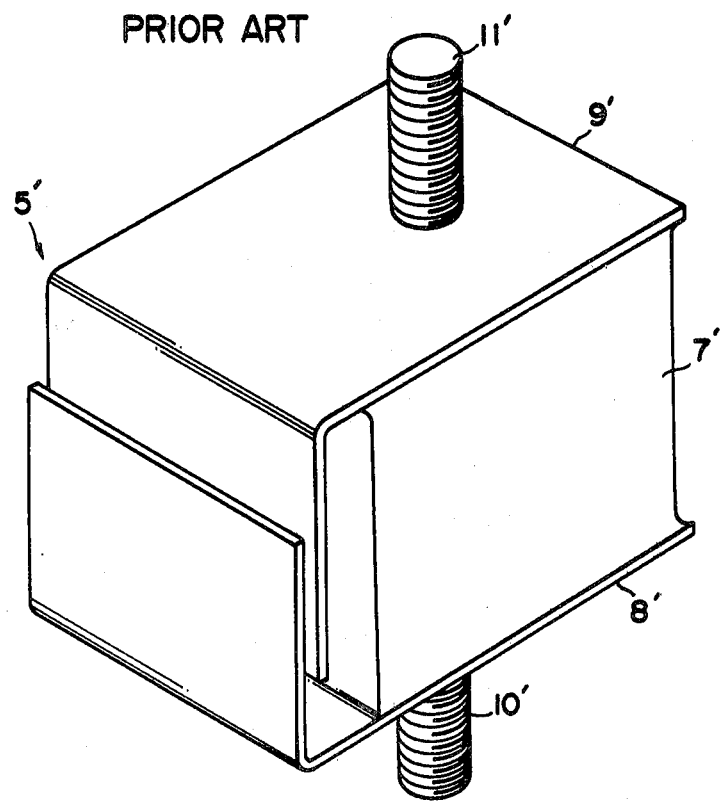
FIG. 2 is a perspective view showing, to an enlarged scale, a shock and vibration insulating unit forming part of the prior-art engine mounting structure illustrated in FIG. 1.

For better understanding of the features and advantages of an engine mounting structure according to the present invention over prior-art engine mounting structure, destriction will be hereinafter made with reference to FIGS. 1 and 2 which show a representative example of a known engine mounting structure. The engine mounting structure as shown is used for the mounting of an internal combustion engine 1 or a lateral suspension member 2 of the body structure of an automotive vehicle. The lateral suspension member 2 extends laterally of the vehicle body structure and is fixedly connected adjacent the opposite lateral ends thereof to right and left side members 3 and 3' of the vehicle body structure. The suspension member 2 thus bridging the side members 3 and 3' has a pair of upstanding bracket portions 4 and 4' positioned on body sides of the engine 1 and adjacent to the side members 3 and 3', respectively.

The prior-art engine mounting structure comprises a pair of shock and vibration insulating units 5 and 5' each of which is connected between each of the bracket portions 4 and 4' of the suspension member 2 and each of engine-side bracket members 6 and 6', respectively, which are secured to the body structure of the engine 1. More specifically, the shock and vibration insulating unit 5 positioned on one side of the engine 1 comprises a resilient block 7 having opposite end faces, a lower coupling member 8 fixedly attached to one of the end faces of the resilient block 7, and an upper coupling member 9 fixedly attached to the other end face of the resilient block 7. Similarly, the shock and vibration insulating unit 5' positioned on the other side of the engine 1 comprises a resilient block 7' having opposite end faces, a lower coupling member 8' fixedly attached to one end face of the resilient block 7', and an upper coupling member 9' fixedly attached to the other end face of the resilient block 7'.

The lower coupling members 8 and 8' are securely connected to the bracket portions 4 and 4' of the suspension member 2 by means of bolts 10 and 10', respectively, while the upper coupling members 9 and 9' are securely connected to the above mentioned engine-side bracket members 6 and 6' by means of bolts 11 and 11', respectively. The resilient blocks 7 and 7' are constructed of a material such as rubber having a spring constant which is selected in such a manner that each of the resilient blocks 7 and 7' is capable of absorbing and dampening the shocks and vibrations which are to be produced in the engine 1 under medium-speed cruising conditions of the vehicle.

Thus, each of the resilient blocks 7 and 7' has a relatively large spring constant and is for this reason capable of absorbing and dampening shocks and vibrations of medium cruising speeds of the vehicle but is not suitable for taking up the shocks and vibrations to be produced under high-speed cruising conditions of the vehicle. The vibrations produced during high-speed cruising of the vehicle are causative of production of stifled booming noises in the vehicle cabin. In order to eliminate such low-frequency noises, the resilient blocks 7 and 7' are required to have such weights that are large enough to absorb the vibrations to be produced by the engine under high-speed cruising conditions of the vehicle. As has been pointed out at the outset of the description, the provision of such heavy resilient blocks results in unwieldy construction of the engine mounting structure as a whole and requires an additional space and additional time and labor for the installation of the engine and engine mounting structure on the vehicle body.

Figure 3:
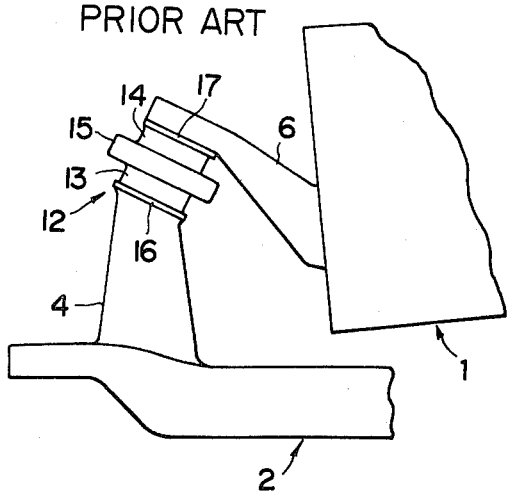
FIG. 3 is a fragmentary front elevation view showing another representative example of a prior-art engine mounting structure.

FIG. 3 shows part of another representative example of the prior-art engine mounting structure. The engine mounting structure comprises a pair of shock and vibration insulating units only one of which is shown and designated by reference numeral 12. The shock and vibration insulating unit 12 comprises lower and upper resilient blocks 13 and 14, and a rigid mass member 15 securely interposed between the resilient blocks 13 and 14. The lower resilient block 13 is securely attached to a lower coupling member 16 fixedly connected to one of the bracket portions such as the bracket portion 4 of the lateral suspension member 2 of the vehicle body structure. The upper resilient block 14 is securely attached to an upper coupling member 17 which is fixed to one of the engine-side bracket members such as the bracket member 6 secured to the body structure of the engine 1. The shock and vibration insulating unit 12 thus constructed is usually designed to be capable of absorbing and dampening vibrations with frequencies higher than about 100 Hz.

The shock and vibration insulating unit included in the prior-art engine mounting structure hereinbefore described with reference to FIG. 3 may be designed in such a manner as to be capable of taking up vibrations with frequencies of about 90 to 140 Hz which are responsible for the production of stifled, droning noises in the vehicle cabin during high-speed cruising of the vehicle. In order to design the shock and vibration insulating unit 12 in this fashion, however, it is required to use an extremely large-sized rigid block as the mass member 15. Such a large-sized mass member could not be stably mounted on the body structure of an automotive vehicle insofar as the insulating unit has the shown construction.

The present invention contemplates provision of useful solutions of these drawbacks which have been inherent in prior-art engine mounting structures of the described natures.

DESCRIPTION OF THE EMBODIMENTS

Figure 4:
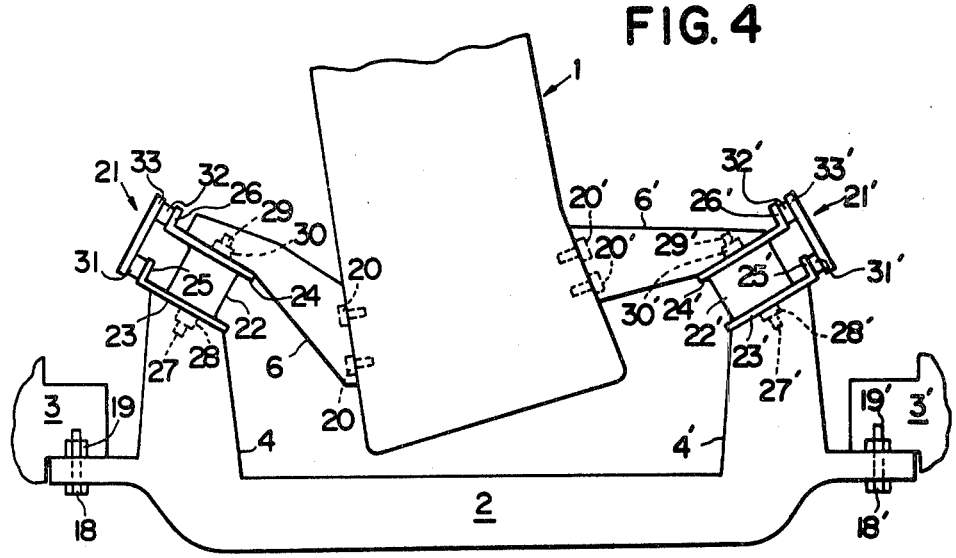
FIG. 4 is a fragmentary front elevation view showing a first preferred embodiment of the engine mounting structure according to the present invention.
Figure 5:
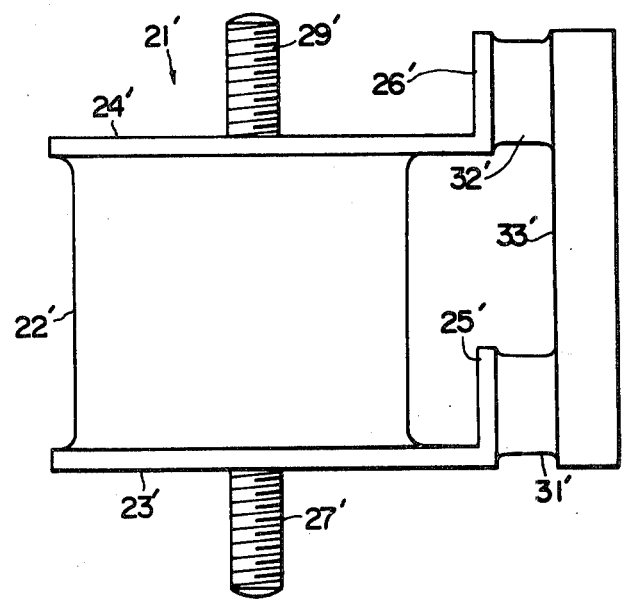
FIG. 5 is a front end view showing, to an enlarged scale, a shock and vibration insulating unit forming part of the embodiment illustrated in FIG. 4.
Figure 6:
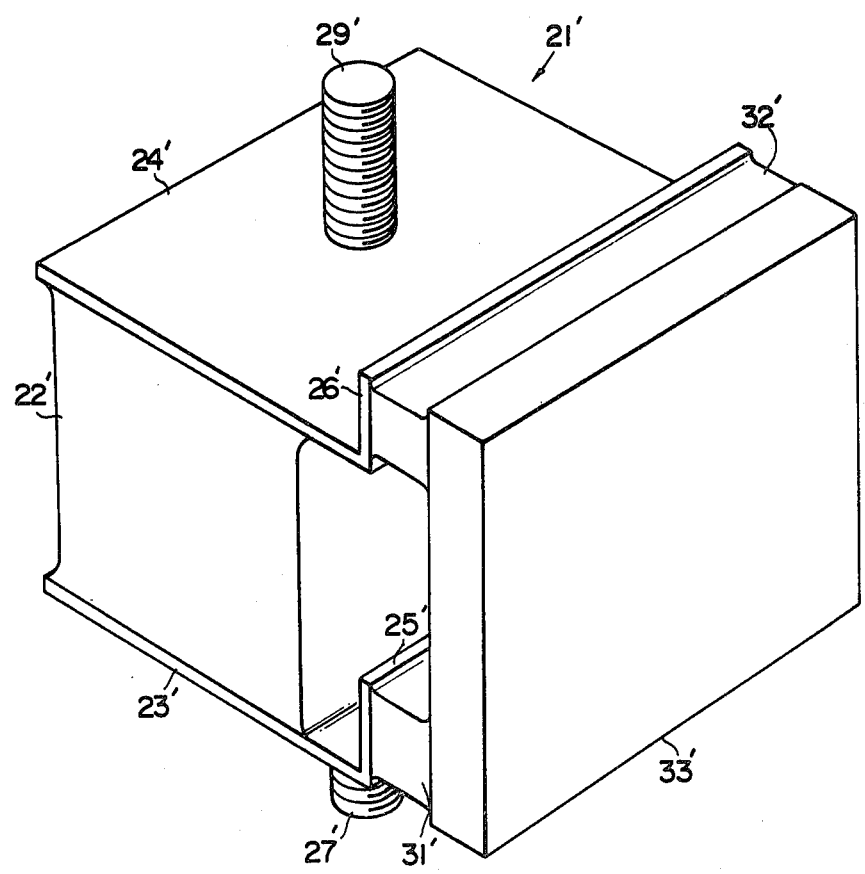
FIG. 6 is a perspective view of the shock and vibration insulating unit shown in FIG. 5.

FIGS. 4 to 6 of the drawings show a first preferred embodiment of the engine mounting structure according to the present invention aiming at provision of such solutions.

Referring first to FIG. 4, the engine mounting structure embodying the present invention is used for the mounting of an automotive internal combustion engine 1 on a suitable lateral support member such as a front suspension member 2 of the body structure of an automotive vehicle. The lateral suspension member 2 extends laterally of the vehicle body structure and is fixedly connected adjacent the lateral ends thereof to right and left side members 3 and 3' of the body structure by suitable fastening means such as bolts 18 and 18' and nuts 19 and 19', respectively. The lateral suspension member 2 thus bridging the side members 3 and 3' of the vehicle body structure has a pair of upstanding bracket portions 4 and 4' positioned on both sides of the engine 1 and adjacent to the side members 3 and 3', respectively. Each of the bracket portions 4 and 4' has an upper end face which is slightly inclined toward the engine 1.

A pair of rigid engine-side bracket members 6 and 6' which are bolted as at 20 and 20' or otherwise securely connected to the body structure of the engine 1. Each of the bracket members 6 and 6' has a lower face spaced apart substantially in parallel from the inclined upper end face of each of the bracket portions 4 and 4' of the lateral suspension member 2.

The engine mounting structure shown in FIG. 4 further comprises a pair of shock and vibration insulating units 21 and 21' provided on both sides of the engine 1. The shock and vibration insulating unit 21 positioned on one side of the engine comprises a main resilient block 22 of, for example, rubber, having spaced, substantially parallel opposite end faces, a rigid first or lower coupling member 23 securely attached to one of the end faces of the resilient block 22, and a rigid second or upper coupling member 24 securely attached to the other end face of the resilient block 22.

The shock and vibration insulating unit 21' provided on the other side of the engine 1 likewise comprises a main resilient block 22' of, for example, rubber having spaced, substantially parallel opposite end faces, a rigid first of lower coupling member 23' securely attached to one of the end faces of the resilient block 22', and a regid second or upper coupling member 24' securely attached to the other end face of the resilient block 22' as will be better seen from FIGS. 5 and 6. The lower and upper coupling members 23 and 24 are generally L-shaped in section and have side edge portions 25 and 25, respectively, which are bent from the remaining portions of the coupling members in directions substantially perpendicular to the above mentioned end faces of the resilient block 22. Likewise, the lower and upper coupling members 23' and 24' are generally L-shaped in section and have side edge portions 25' and 26', respectively, which are bent from the remaining portions of the coupling members in directions substantially perpendicular to the opposite end faces of the resilient block 22'. Each of the resilient blocks 22 and 22' is constructed of a suitable resilient material having a predetermined spring constant Ke.

The lower coupling member 23 is fixedly attached to the inclined upper end face of the bracket portion 4 of the suspension member 2 by suitable fastening means such as a bolt 27 welded to the coupling member 23 and secured to the bracket portion 4 by means of a nut 28. Likewise, the lower coupling member 23' is fixedly attached to the inclined upper end face of the bracket portion 4' of the suspension member 2 by suitable fastening means such as a bolt 27' welded to the coupling member 23' and secured to the bracket portion 4' by means of a nut 28'. On the other hand, the upper coupling member 24 is fixedly attached to the inclined lower face of the engine-side bracket 6 by suitable fastening means such as a bolt 29 welded to the coupling member 24 and secured to the bracket member 6 by means of a nut 30. Similarly, the upper coupling member 24' is fixedly attached to the inclined lower face of the engine-side bracket member 6' by suitable fastening means such as a bolt 29' welded to the coupling member 24' and secured to the bracket member 6' by means of a nut 30'.

Each of the shock and vibration insulating units 21 and 21' side bracket members 6 and 6' further comprises vibration cancelling means adapted to cancel predetermined frequency components of the vibrations to be transmitted through the oscillatory system constituted by each of the hereinbefore described resilient blocks 22 and 22'.

Figure 7:
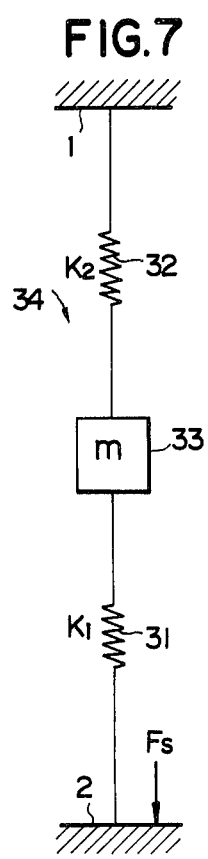
FIG. 7 is a diagram showing, in a modelled form, the oscillatory system constituted by the vibration cancelling means forming part of the shock and vibration insulating unit illustrated in FIGS. 5 and 6.

In the embodiment illustrated in FIG. 4 the vibration cancelling means of the shock and vibration insulating unit 21 is shown comprising a first or lower auxiliary resilient block 31 securely attached to the outer face of the bent side edge portion 25 of the lower coupling member 23, a second or upper auxiliary resilient block 32 securely attached to the outer face of the bent side edge portion 26 of the upper coupling member 24, and a rigid mass member 33 securely attached to the lower and upper auxiliary resilient blocks 31 and 32. Thus, the lower auxiliary resilient block 31 structurally intervenes between the lower coupling member 23 and the mass member 33 while the upper auxiliary resilient block 32 structurally intervenes between the upper coupling member 24 and the mass member 33. The vibration cancelling means of the other shock and vibration insulating unit 21' is similar in construction to the vibration cancelling means of the shock and vibration insulating unit 21 and, thus, comprises a first or lower auxiliary resilient block 31', a second or upper auxiliary resilient block 32' and a rigid mass member 33' which are arranged so that the lower auxiliary resilient block 31' structurally intervenes between the lower coupling member 23' and the mass member 33' while the upper auxiliary resilient block 32' structurally intervenes between the upper coupling member 24' and the mass member 33' as will be betterseen from FIGS. 5 and 6. Each of the lower auxiliary resilient blocks 31 and 31' is constructed of a suitable resilient material having a predetermined spring constant $K_1$ and, likewise, each of the upper auxiliary resilient blocks 32 and 32' is constructed of a suitable resilient material having a predetermined spring constant $K_2$. On the other hand, each of the rigid mass members 33 and 33' has a predetermined mass m. The vibration cancelling means of each of the shock and vibration insulating units 21 and 21' thus constructed and arranged constitutes an oscillatory system 34 which is schematically illustrated in FIG. 7 of the drawings.

When, in operation, the vehicle is cruising at relatively high speeds, the vibrations produced in the engine 1 tend to produce booming noises in the vehicle cabin. If, under these conditions, the above mentioned oscillatory system 34 is assumed to be subjected to vibrations in a sinusoidal mode with the amount of displacement x and the exciting frequency f, then the force Fs transmitted from the oscillatory system 34 to the suspension member 2 and the resonance frequency fc of the oscillatory system 34 are respectively given by the following equations:

$$Fs = \frac{K_1 \cdot K_2}{\{K_1 + K_2 - (2\pi f)^2\} \cdot m} \cdot x, \text{ and } fc = \frac{1}{2\pi} \sqrt{\frac{K_1 + K_2}{m}}.$$

Figure 8A:
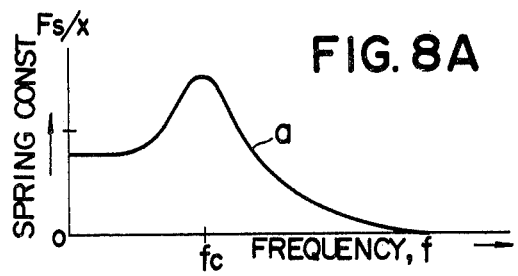
FIG. 8A is a graph showing the variation in the spring constant, in terms of vibration frequency, achieved in the oscillatory system illustrated in FIG. 7.
Figure 8B:
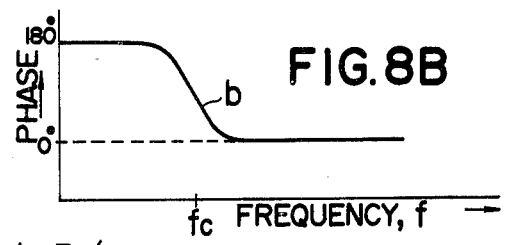
FIG. 8B is a graph showing the phase characteristic of the vibrations transmitted through the oscillatory system illustrated in FIG. 7.

Considering the vibration components damped by the lower and upper auxiliary resilient blocks 31 and 32 (or the resilient blocks 31' and 32'), the spring constant Fs/x of the oscillatory system 34 is graphically represented in terms of the frequency f by curve a shown in FIG. 8A. From curve a it will be understood that the spring constant Fs/x of the oscillatory system 34 assumes a maximum value at the resonance frequency fc. On the other hand, the force Fs applied to the suspension member 2 from the oscillatory system 34 is in phase with the displacement x at vibration frequencies lower than the resonance frequency fc and is 180 degrees opposite in phase to the displacement x at vibration frequencies higher than the resonance frequency fc, as will be seen from curve b of FIG. 8B.

Figure 10:
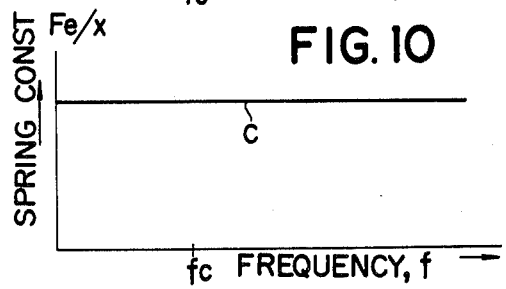
FIG. 10 is a graph showing the variation in the spring constant, in terms of the vibration frequency, achieved in the oscillatory system illustrated in FIG. 9.
Figure 9:
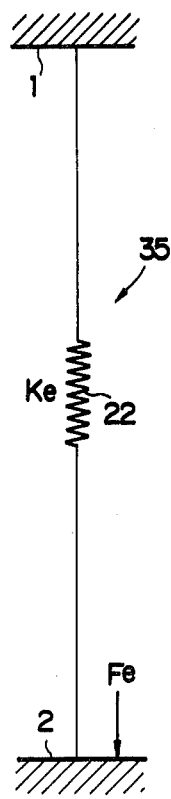
FIG. 9 is a diagram showing, in modelled form, the vibration system constituted by the shock and vibration insulating unit shown in FIGS. 5 and 6 when the insulating unit is assumed to be devoid of the vibration cancelling means represented by the oscillatory system illustrated in FIG. 7.

On the other hand, each of the main resilient blocks 22 and 22' of the shock and vibration insulating units 21 and 21' forms part of an oscillatory system 35 schematically shown in FIG. 9. When the oscillatory system 35 thus constituted by each of the resilient blocks 22 and 22' is subjected to vibrations in a sinusoidal mode with the displacement x and the exciting frequency f, the force Fe transmitted from the oscillatory system 35 to the suspension member 2 is given by $$Fe = Ke \cdot x,$$

when the vibration components damped by the resilient block forming part of the oscillatory system 35 are excluded from the force. The spring constant Fe/x of the oscillatory system 35 remains substantially constant throughout the range of the vibration frequency f as will be seen from plot c shown in FIG. 10.

Figure 12:
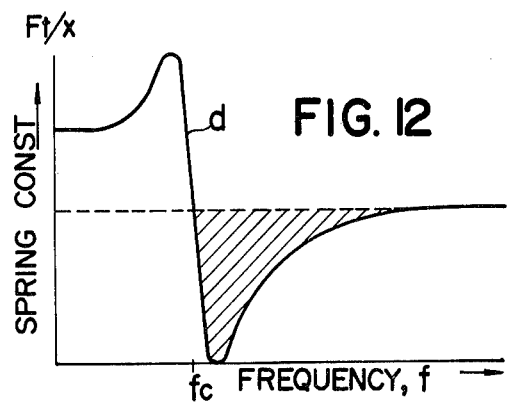
FIG. 12 is a graph showing the variation in the spring constant, in terms of vibration frequency, achieved in the oscillatory system illustrated in FIG. 11, viz., in the shock and vibration insulating unil illustrated in FIGS. 5 and 6.
Figure 11:
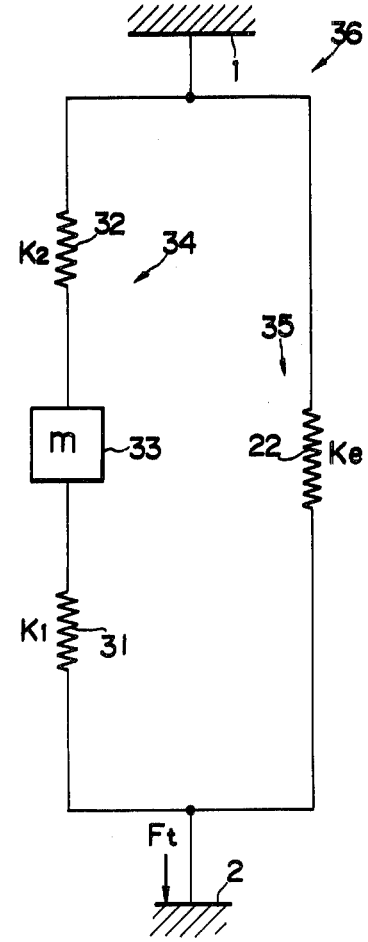
FIG. 11 is a diagram showing, in modelled form, the overall oscillatory system constituted by the shock and vibration insulating unit shown in FIGS. 5 and 6.

FIG. 11 shows schematically an oscillatory system 36 composed of the parallel combination of the above described oscillatory systems 34 and 35. The oscillatory system 36 shown in FIG. 11 is thus constituted by each of the shock and vibration insulating units 21 and 21' of the engine mounting structure shown in FIGS. 4 to 6. On the other hand, FIG. 12 shows a curve d which represents the relationship between the frequency f and the spring constant Ft/x achieved of the oscillatory system 36 composed of the parallel combination of the oscillatory systems 34 and 35. As will be seen from curve d in FIG. 12, the force Ft transmitted to the suspension member 2 from the oscillatory system 35 or, in other words, each of the shock and vibration insulating units 21 and 21' is given by the sum of the forces Fs and Fe at vibration frequencies lower than the resonance frequency fc and by the difference between the forces Fs and Fe at vibration frequencies higher than the resonance frequency fc.

Meanwhile, it is well known in the art that the vibrations to produce booming noises in a vehicle cabin occur at frequencies ranging from about 90 Hz to about 140 Hz when the engine is of the four-cylinder four-stroke-cycle type. This means that each of the shock and vibration insulating units 21 and 21' is effective to reduce such noises to a minimum if the insulating unit is designed in such a manner that the resonance frequency fc of the oscillatory system 34 falls within a predetermined range slightly smaller than the range of between about 90 Hz and 140 Hz. Such a purpose can be achieved when the first and second auxiliary resilient blocks 31 and 32 are designed to have spring constants or load rates $K_1$ and $K_2$ each within the range of between about 5 kgs/mm and about 20 kgs/mm if the mass m of the mass member 33 is selected to fall within the range of between about 0.3 kg and about 1.5 kg and the spring constant or load rate Ke is selected to fall within the range of between about 25 kgs/mm and about 45 kgs/mm. This is not only justified by the above presented equation for the resonance frequency fc but has been ascertained experimentally.

With the oscillatory system 34 being thus designed, the spring constant Ft/x of the overall oscillatory system 36 can be successfully reduced and as a consequence production of booming noises in the vehicle cabin can be significantly precluded at vibration frequencies within the range (indicated by a hatched area in the graph of FIG. 12) which is responsible for the production of booming noises in the vehicle cabin. At vibration frequencies lower than such a range, on the other hand, the spring constant Ft/x of the oscillatory system 36 assumes relatively large values and is for this reason effective to preclude oscillating motions of the vehicle body as caused due to the weight of the engine 1.

When the engine 1 is to be mounted on the suspension member 2 during assemblage of a vehicle, the shock and vibration insulating units 21 and 21' are first secured to the bracket portions 4 and 4', respectively, of the suspension member 2 by the bolts 27 and 27' and nuts 28 and 28'. The engine 1 having the engine-side bracket members 6 and 6' preliminarily attached thereto by the bolts is thereafter assembled to the shock and vibration insulating units 21 and 21' by tightening the bolts 29 and 29' to the engine-side bracket members 6 and 6' by means of the nuts 30 and 30', respectively.

Figure 13:
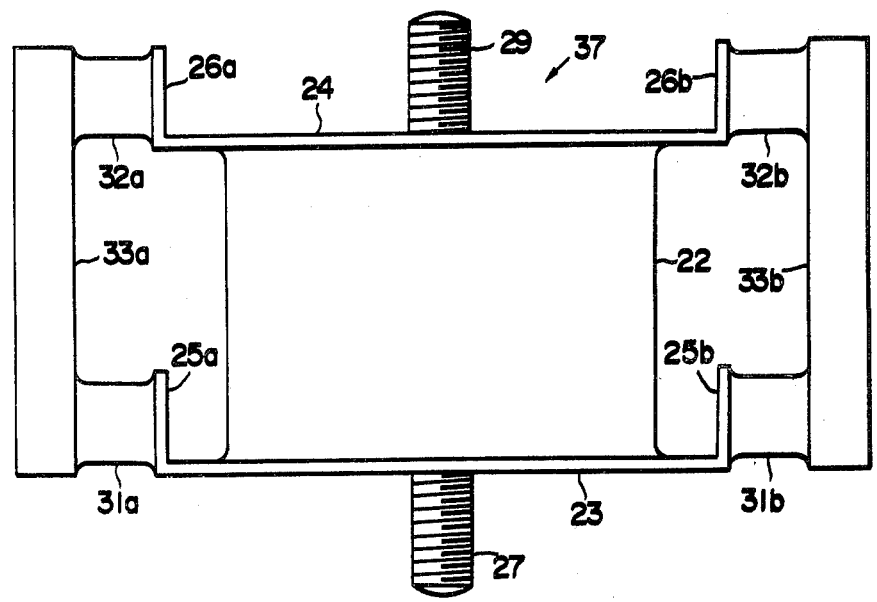
FIG. 13 is a front end view showing a shock and vibration insulating unit forming part of a second preferred embodiment of the engine mounting structure according to the present invention.

FIGS. 13 and 14 of the drawings show a shock and vibration insulating unit 37 which forms part of a second embodiment of the engine mounting structure according to the present invention. The shock and vibration insulating unit 37 is a modification of the insulating unit 21 shown in FIG. 4 and constitutes one of two such units of an engine mounting structure embodying the present invention.

As illustrated in FIGS. 13 and 14, the shock and vibration insulating unit 37 comprises a main resilient block 22 of, for example, rubber having substantially parallel opposite end faces, a rigid first or lower coupling member 23 securely attached to one of the end faces of the resilient block 22, and a rigid second or upper coupling member 24 securely attached to the other end face of the resilient block 22. The lower coupling member 23 is generally U-shaped in section and has a pair of side edge portions 25a and 25b which are spaced apart substantially in parallel from each other and which are bent from the remaining portion of the coupling member 23 in directions substantially perpendicular to the above mentioned end faces of the resilient block 22. Likewise, the upper coupling member 24 is generally U-shaped in section and has a pair of side edge portions 26a and 26b which are spaced apart substantially in parallel from each other and which are bent from the remaining portion of the coupling member 24 in directions substantially perpendicular to the end faces of the resilient block 22. The side edge portions 26a and 26b of the upper coupling member 24 are spaced apart from and substantially aligned with the side edge portions 25a and 25b, respectively, of the lower coupling member 23 in directions parallel with the direction of thickness of the resilient block 22. The resilient block 22 is constructed of a suitable resilient material having a predetermined spring constant.

The shock and vibration insulating unit 37 shown in FIGS. 13 and 14 of drawings further comprises a pair of vibration cancelling means each similar in construction to the vibration cancelling means of each of the shock and vibration insulating units 21 and 21' in the embodiment of FIG. 4. Thus, the vibration cancelling means of the shock and vibration insulating unit 37 shown in FIGS. 13 and 14 comprises a pair of first or lower auxiliary resilient blocks 31a and 31b securely attached to the outer faces of the bent side edge portions 25a and 25b, respectively, of the lower coupling member 23, a pair of second or upper auxiliary resilient blocks 32a and 32b securely attached to the outer faces of the bent side edge portions 26a and 26b, respectively, of the upper coupling member 24, and a pair of rigid mass members 33a and 33b which are securely attached to the lower auxiliary resilient blocks 31a and 31b, respectively, and the upper auxiliary resilient blocks 32a and 32b, respectively. Thus, the lower and upper auxiliary resilient blocks 31a and 32a of one of the vibration cancelling means structurally intervene between the mass member 33a and the lower and upper coupling members 23 and 24, respectively. Likewise, the lower and upper auxiliary resilient blocks 31b and 32b of the other vibration cancelling means structurally intervene between the mass member 33b and the lower and upper coupling members 23 and 24, respectively. Each of the auxiliary resilient blocks 31a, 31b, 32a and 32b is constructed of a suitable resilient material having a predetermined spring constant and each of the mass members 33a and 33b has a predetermined mass. Though not shown in the drawings, the shock and vibration insulating unit 37 thus constructed is securely connected to the bracket portions of a suitable cross member such as a front suspension member of a vehicle body structure by means of, for example, a bolt 27 projecting from the lower coupling member 23 and further to the body structure of an automotive engine by means of, for example, a bolt 29 projecting from the upper coupling memeber 24 and screwed to one of suitable engine-side bracket members secured to the body structure of the engine.

As will be readily understood from the foregoing description, each of the two vibration cancelling means forming part of the shock and vibration insulating unit 37 shown in FIGS. 13 and 14 constitutes an oscillatory system similar to the oscillatory system 34 illustrated in FIG. 7. Thus, the engine mounting structure using the shock and vibration insulating unit 37 is adapted to provide a wide range of selection among various performance characteristics which can be varied by varying the respective performance characteristics of the oscillatory systems constituted by the two vibration cancelling means of the unit 37.

Figure 15:
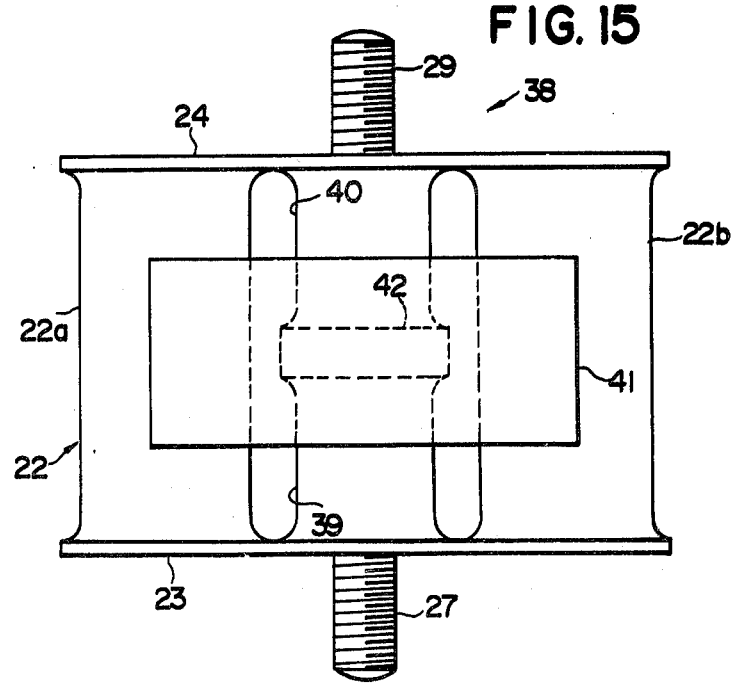
FIG. 15 is a front end view showing a shock and vibration insulating unit forming part of a third preferred embodiment of the engine mounting structure according to the present invention.
Figure 16:
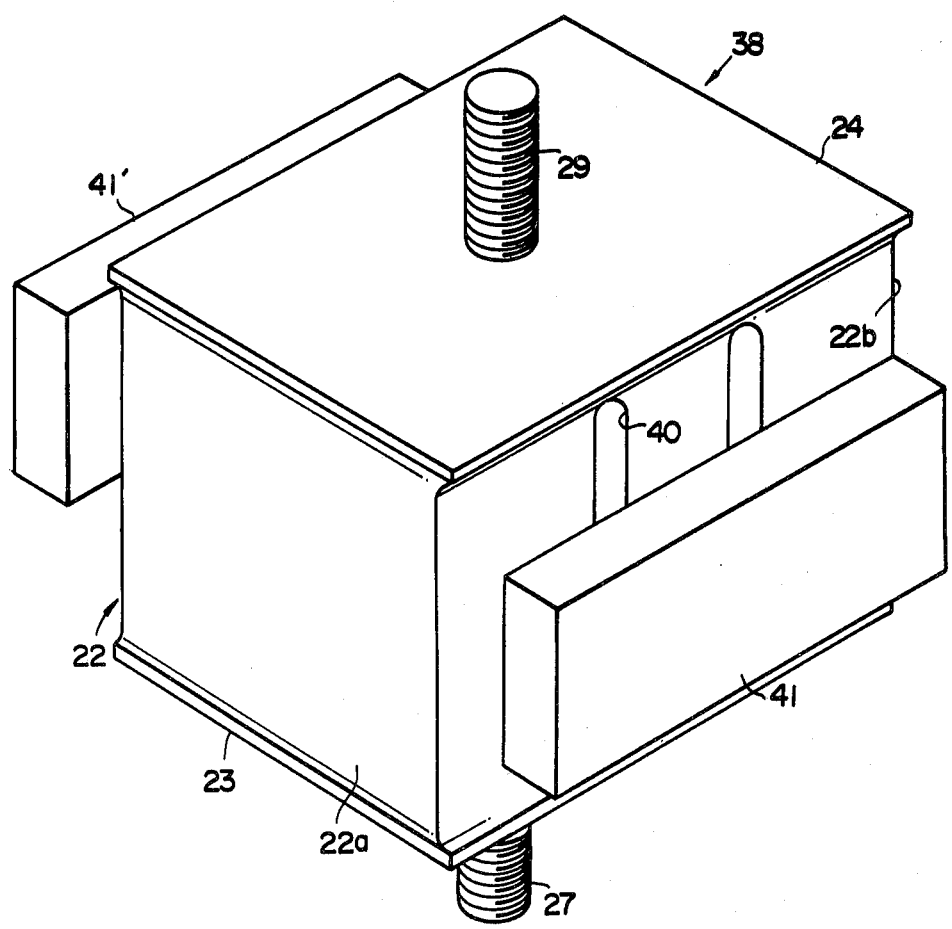
FIG. 16 is a perspective view of the shock and vibration insulating unit illustrated in FIG. 15.

FIGS. 15 and 16 of the drawings show a shock and vibration insulating unit 38 which forms part of a third preferred embodiment of the engine mounting structure according to the present invention. The shock and vibration insulating unit 38 is also a modification of the insulating unit 21 shown in FIG. 4 and constitutes one of the two such shock and vibration insulating units of an engine mounting structure embodying the present invention.

As illustrated in FIGS. 15 and 16, the shock and vibration insulating unit 38 comprises a main resilient block 22 consisting of two independent sections 22a and 22b which are spaced apart substantially in parallel from each other and each of which has substantially parallel opposite end faces. The shock and vibration insulating unit 38 further comprises a rigid first or lower coupling member 23 securely attached to one of the end faces of each of the sections 22a and 22b, and a rigid second or upper coupling member 24 securely attached to the other end faces of the sections 22a and 22b. The resilient block 22 thus composed of the two sections 22a and 22b is constructed of a suitable resilient material such as rubber having a predetermined spring constant.

The shock and vibration insulating unit 38 shown in FIGS. 15 and 16 further comprises vibration cancelling means comprising first and second or lower and upper auxiliary resilient block 39 and 40 positioned intermediate between the sections 22a and 22b of the main resilient block 22 and each having substantially parallel opposite end faces. The lower auxiliary resilient block 39 is securely attached over one of its opposite end faces to the inner face of the lower coupling member 23 and, likewise, the upper auxiliary resilient block 40 is securely attached over one of its end faces to the inner face of the upper coupling member 24. Furthermore, the lower and upper auxiliary resilient blocks 39 and 40 are sidewise spaced apart from the sections 22a and 22b of the main resilient block 22 and has the other end faces thereof spaced apart substantially from each other as will be seen from the illustration by broken lines in FIG. 15. Each of the auxiliary resilient blocks 39 and 40 is also constructed of a suitable resilient material such as compressible rubber having a predetermined spring constant. The use of a compressible rubber as the material of the resilient blocks 39 and 40 will add to the durability and accordingly the service life of the shock and vibration insulating unit 38 as a whole.

The vibration cancelling means of the shock and vibration insulating unit 38 illustrated in FIGS. 15 and 16 further comprises a pair of mass members 41 and 41' each having a lug portion 42 (FIG. 15) interposed under compression between the lower and upper auxiliary resilient blocks 39 and 40. Thus, the lower auxiliary resilient block 39 structurally intervenes between the lower coupling member 23 and each of the mass members 41 and 41' and, likewise, the upper auxiliary resilient block 40 structurally intervenes between the upper coupling member 24 and each of the mass members 41 and 41'. Each of the mass members 41 and 41' has a predetermined mass.

Though not shown in the drawings, the shock and vibration insulating unit 38 thus constructed is securely connected between one of the bracket portions of a suitable cross member such as a front suspension member of a vehicle body structure by means of, for example, a bolt 27 projecting from the lower coupling member 23 and further to the body structure of an automotive engine by means of, for example, a bolt 29 projecting from the upper coupling member 24 and screwed into one of engine-side bracket members secured to the engine body structure.

From the foregoing description it will have been appreciated that the engine mounting structure according to the present invention is characterized by the provision of of the vibration cancelling means in each of the shock and vibration insulating units of the structure. By virtue of such vibration cancelling means, not only transmission of vibrations from the engine to the vehicle body structure during medium-speed cruising of the vehicle but also production of stifled booming noises in the vehicle cabin under high-speed cruising conditions of the vehicle can be precluded effectively.

What is claimed is:

1. An engine mounting structure for mounting an automotive engine on the body structure of an automotive vehicle, comprising at least one shock and vibration insulating unit which comprises:
   a first coupling member to be connected to the body structure of the vehicle;
   a second coupling member to be connected to the body structure of the engine and spaced apart from the first coupling member;
   a main resilient block intervening directly between the first and second coupling members; and
   vibration cancelling means comprising at least one combination of a mass member, a first auxiliary resilient block intervening directly between the first coupling member and the same member, and a second auxiliary resilient block intervening directly between the second coupling member and the mass member.

2. An engine mounting structure at set forth in claim 1, in which said combination constitutes one of two such combinations, the two combinations being provided across said main resilient block.

3. An engine mounting structure as set forth in claim 1, in which said main resilient block consists of two substantially similar sections spaced apart from each other and in which said first and second coupling members have respective inner faces securely attached to said sections, said first and second auxiliary resilient blocks being securely attached to the inner faces of said first and second coupling members, respectively, and being spaced apart from each other and from said sections, said mass member having a portion interposed between said first and second auxiliary resilient blocks.

4. An engine mounting structure as set forth in claim 3, in which each of said auxiliary resilient blocks is constructed of compressible rubber.

5. An engine mounting structure as set forth in claim 1, in which said engine is of the four-cylinder four-stroke-cycle type and in which said vibration cancelling means is constructed to provide a resonance frequency slightly lower than the range of between about 90 Hz and about 140 Hz.

* * * * *